US007880718B2

(12) United States Patent
Cradick et al.

(10) Patent No.: US 7,880,718 B2
(45) Date of Patent: Feb. 1, 2011

(54) APPARATUS, SYSTEM, AND METHOD FOR ELECTRONIC PAPER FLEX INPUT

(75) Inventors: Ryan Kirk Cradick, Rochester, MN (US); Zachary Adam Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 11/379,190

(22) Filed: Apr. 18, 2006

(65) Prior Publication Data

US 2007/0242033 A1   Oct. 18, 2007

(51) Int. Cl.
G09G 5/00   (2006.01)

(52) U.S. Cl. .................. 345/156; 345/107; 345/157; 345/158

(58) Field of Classification Search .................. None
See application file for complete search history.

(56) References Cited

U.S. PATENT DOCUMENTS

| | | | | |
|---|---|---|---|---|
| 4,598,291 | A * | 7/1986 | Griffin | 340/870.37 |
| 5,389,945 | A * | 2/1995 | Sheridon | 345/85 |
| 5,920,401 | A * | 7/1999 | Street et al. | 358/400 |
| 6,297,838 | B1 * | 10/2001 | Chang et al. | 715/863 |
| 2003/0227441 | A1 * | 12/2003 | Hioki et al. | 345/156 |
| 2004/0120684 | A1 | 6/2004 | Ishibashi et al. | 385/141 |
| 2004/0130524 | A1 * | 7/2004 | Matsui | 345/156 |
| 2004/0183787 | A1 * | 9/2004 | Geaghan et al. | 345/173 |
| 2005/0013462 | A1 | 1/2005 | Rhoads | 382/100 |
| 2005/0154798 | A1 * | 7/2005 | Nurmi | 710/1 |
| 2006/0107219 | A1 * | 5/2006 | Ahya et al. | 715/745 |
| 2006/0197753 | A1 * | 9/2006 | Hotelling | 345/173 |

FOREIGN PATENT DOCUMENTS

| | | |
|---|---|---|
| JP | 10-171620 | 6/1998 |
| JP | 2005-031448 | 2/2005 |
| JP | 2005-128201 | 5/2005 |
| JP | 2005-165129 | 6/2005 |
| JP | 2005 267170 | 9/2005 |

(Continued)

OTHER PUBLICATIONS

"Flexible E-Paper on its Way" (AP) May 8, 2005 *Wired News*-http://www.wired.com/news/technology/0,1282,58765,00.html.

(Continued)

*Primary Examiner*—Amare Mengistu
*Assistant Examiner*—Antonio Xavier
(74) *Attorney, Agent, or Firm*—Kunzler Needham Massey & Thorpe

(57) ABSTRACT

An apparatus, system, and method are disclosed to control an application interface displayed on electronic paper. A detection module is included to detect intentional bending of an electronic paper at a particular location. A correlation module is included to correlate the particular location where the electronic paper is bent with a user interface command in an application. An execution module is included to execute the user interface command. In one embodiment, a display module is included to update display information on the electronic paper in response to execution of the user interface command. The electronic paper may include a detector in contact with the electronic paper to provide electronic paper bend position information to the detection module.

20 Claims, 5 Drawing Sheets

FOREIGN PATENT DOCUMENTS

WO 2004/100281 11/2004

OTHER PUBLICATIONS

"Shape Sensors under development at Luna Innovations" *Luna Innovations* Jan. 7, 2006 http://www.lunainnovations.com/Products/shape.asp.

"Electronic Reusable paper" *Untitled Document* Jan. 17, 2006 http:www2.parc.com/hsl/projects/gyricon/.

"Fiber-Optic Sensor Components Part 1: Introduction to Fiber-Optic sensing" *Sensor Technology and Design* May 2002. Peter Fuhr, San Jose State University, http://www.semsorsmag.com/articles/0502/fiber/main.shtml.

\* cited by examiner

APPARATUS, SYSTEM, AND METHOD FOR ELECTRONIC PAPER FLEX INPUT

BACKGROUND OF THE INVENTION

1. Field of the Invention

This invention relates to electronic paper and more particularly relates to controlling applications associated with electronic paper by intentionally bending the electronic paper.

2. Description of the Related Art

Electronic paper, or e-paper, is an exciting new technology that combines the flexibility of paper with the advantages of electronic displays. Electronic paper is typically made of a material that is flexible, light weight, and thin and can display electronically generated information. Electronic paper is a display that can be bent, rolled up and even twisted while still displaying crisp images and text. Electronic paper combines many of the desired features of traditional paper with an ability to update what is displayed on the electronic paper electronically. In addition, electronic paper has the advantage over conventional paper in that it can be reused over and over again.

Electronic paper can be used in many applications. For example, electronic paper may be used to produce very thin and portable signage. Electronic paper may be sewn in with clothing to display advertising, personal messages, or other information. Electronic paper might even be used to create a portable video display to be worn on a wrist—maybe even to display plays diagramed by a coach for a football quarterback.

One type of electronic paper comprises a thin plastic sheet with millions of small beads imbedded in the plastic which are similar to toner particles. The beads are each contained in an oil-filled cavity and can move within the cavity. The beads respond to an electric field and rotate so that a dark side of the bead is near the surface of the electronic paper for one type of charge or so that a light side is near the surface for the opposite charge. This type of paper can be passed through a special printer or similar device to create a display. The electronic paper can be reused over and over again by simply re-printing using the special printer. This type of electronic paper can be thought of as a passive electronic paper.

Another type of electronic paper that is receiving much more attention than the passive electronic paper may be termed active electronic paper. This active electronic paper (hereinafter "electronic paper") is controlled more like a traditional display by communicating data to the electronic paper. One method of creating active electronic paper involves use of a stainless steel foil topped with a thin layer of circuits to control a layer of electronic ink. A processor or circuits used to control the electronic paper may be in a computer or may be embedded on the electronic paper. Connection to the electronic paper may be wired or wireless.

Controlling a display or application generating a display on electronic paper, however, is a problem. Controlling an application generating a display on electronic paper may be burdensome using traditional input devices such as a keyboard, mouse, or other device traditionally used with a computer. The use of such devices defeats some of the portability advantages of electronic paper.

From the foregoing discussion, it should be apparent that a need exists for an apparatus, system, and method for controlling an application associated with a display on electronic paper by detecting intentional bending of the electronic paper at specified locations. Beneficially, such an apparatus, system, and method would allow a user to bend electronic paper at various pre-defined locations to control an application that uses the electronic paper as a display. A user may bend a sheet of electronic paper in one location to bring up a menu or in another location to scroll the screen, or in another location to move a cursor—thus avoiding a need to control an application via a keyboard, a mouse, or other input device.

SUMMARY OF THE INVENTION

The present invention has been developed in response to the present state of the art, and in particular, in response to the problems and needs in the art that have not yet been fully solved by currently available methods to execute user interface commands of an application running on electronic paper. Accordingly, the present invention has been developed to provide an apparatus, system, and method to execute user interface commands of an application running on electronic paper that overcome many or all of the above-discussed shortcomings in the art.

The apparatus to control an application interface displayed on electronic paper is provided with a plurality of modules configured to functionally execute the necessary steps of detecting intentional bending of electronic paper and executing a user interface command where the bend occurs at a particular location. These modules in the described embodiments include a detection module that detects intentional bending of an electronic paper at a particular location. A correlation module is included to correlate the particular location where the electronic paper is bent with a user interface command in an application. An execution module is included to execute the user interface command.

The apparatus, in one embodiment, includes a display module that updates display information on the electronic paper in response to execution of the user interface command. In another embodiment, the electronic paper includes a detector in contact with the electronic paper and configured to provide electronic paper bend position information to the detection module. The detector, in one embodiment, includes a fiber-optic cable configured to provide the fiber-optic cable's spatial resolution. In another embodiment, the fiber-optic cable is configured in a grid pattern in contact with the electronic paper. In yet another embodiment, the detection module includes a filter module that distinguishes between unintentional movement of the electronic paper and intentional bending of the electronic paper at a particular location.

The apparatus is further configured, in one embodiment, to include an assignment module that assigns a region of the electronic paper to at least one corresponding user interface command. In another embodiment, the apparatus includes a profile module that stores a profile referenced by the detection module, wherein the profile comprises sensitivity parameters associated with an environmental condition. The profile module, in one embodiment, includes a sensor adjustment module that adjusts sensitivity parameters based on input from an environmental sensor. In another embodiment, the profile module includes a pattern adjustment module that adjusts sensitivity parameters based on a pattern of use. In a further embodiment, the apparatus includes a shutdown module that stops detecting intentional bending of at least a portion of the electronic paper based on a group of factors consisting of non-use, user input, and an application interface configuration.

A system of the present invention is also presented to control an application interface displayed on electronic paper. The system may be embodied in an electronic paper. In particular, the system, in one embodiment, includes a processor in communication with the electronic paper and configured to execute an application and a memory in communication with the processor. The memory includes a detection module that detects intentional bending of the electronic paper at a particular location. The memory includes a correlation module that correlates the particular location where the electronic paper is bent with a user interface command in the application. The memory also includes an execution module that executes the user interface command and a display module that updates display information on the electronic paper in response to the user interface command.

In one embodiment, the processor and memory are onboard the electronic paper and the system includes a port connected to the processor configured to exchange data between the processor and a computer, wherein the port supports a wireless communication. In another embodiment, the electronic paper includes fiber-optic cable in contact with the electronic paper to provide electronic paper bend position information to the detection module, wherein the fiber-optic cable is configured to provide the fiber-optic cable's spatial resolution. The system may further include a power supply onboard the electronic paper that provides power to the electronic paper, processor, and memory.

A method of the present invention is also presented to control an application interface displayed on electronic paper. The method in the disclosed embodiments substantially includes the steps necessary to carry out the functions presented above with respect to the operation of the described apparatus and system. In one embodiment, the method includes detecting intentional bending of an electronic paper at a particular location, correlating the particular location where the electronic paper is bent with a user interface command in an application, and executing the user interface command.

The method also may include updating display information on the electronic paper in response to execution of the user interface command. In another embodiment, the method includes distinguishing between unintentional and intentional bending of the electronic paper at a particular location. In a further embodiment, the method includes adjusting sensitivity parameters based on input from an environmental sensor. In yet another embodiment, the method includes adjusting bending detection sensitivity parameters based on a pattern of use.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
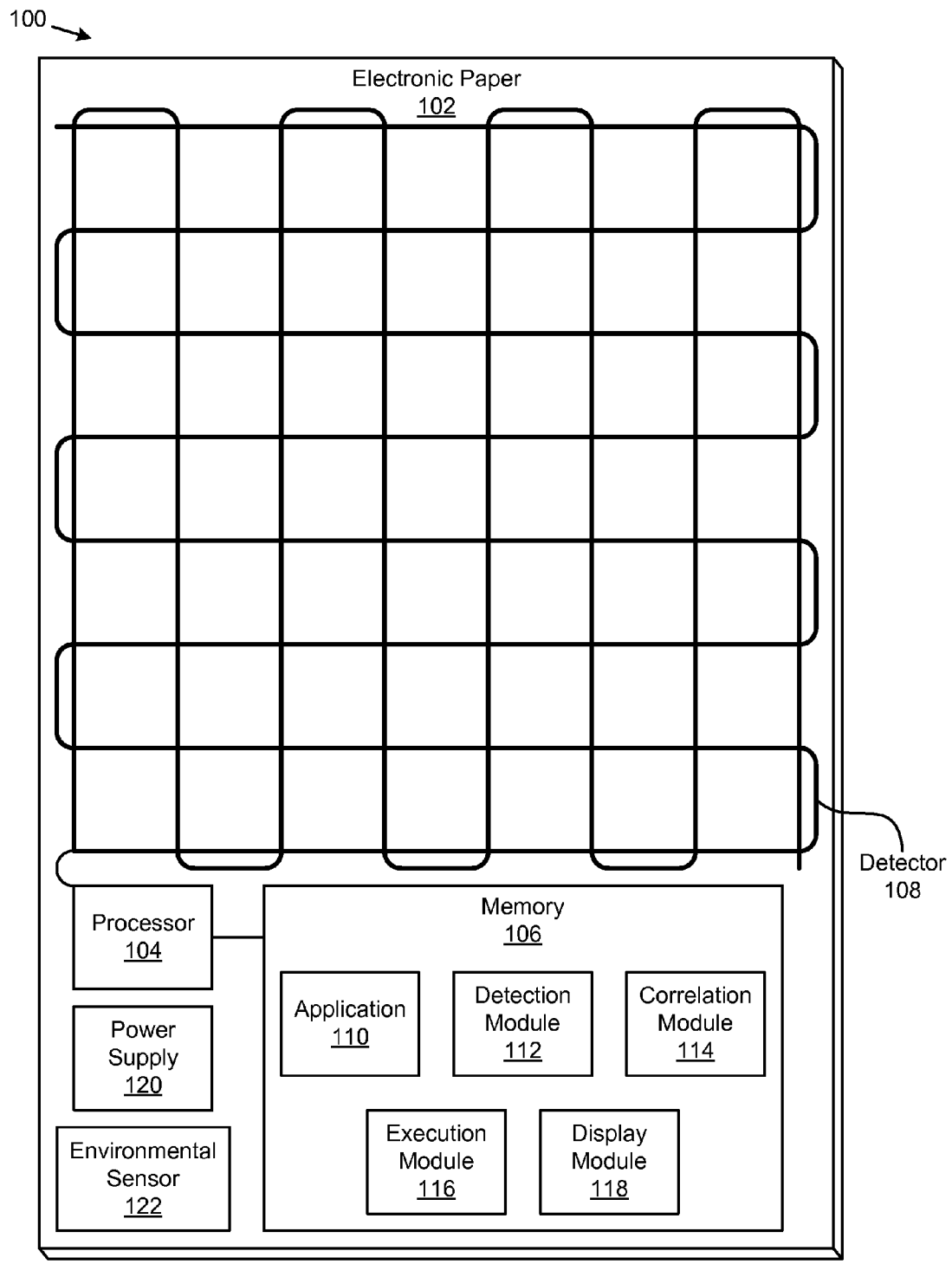
FIG. 1 is a schematic block diagram illustrating one embodiment of a system to control an application interface displayed on electronic paper in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 to control an application interface displayed on electronic paper 102 in accordance with the present invention. The electronic paper 102 includes a processor 104, a memory 106, and a detector 108. The memory 106 includes an application 110, a detection module 112, a correlation module 114, execution module 116, and a display module 118. In one embodiment, the electronic paper 102 includes a power supply 120 and in another embodiment, the electronic paper 102 includes an environmental sensor 122. The devices and modules listed above are described below.

In one embodiment, the electronic paper 102 is rolled from bottom to top and the processor 104, memory 106, power supply 120, or other devices are in a cylinder upon which the electronic paper 102 is rolled. In another embodiment, the processor 104, memory 106, power supply 120, or other devices are embedded in the electronic paper 102 using flexible circuitry. All or part of the devices may be included with the electronic paper 102. One of skill in the art will recognize other ways to combine processors 104, memory 106, power supplies 120, sensors 122, or other devices with electronic paper 102.

The electronic paper 102, in one embodiment, includes a processor 104 in communication with the electronic paper 102. The electronic paper 102 may include a port connected to the processor 104. The port may be configured to exchange data between the processor 104 and another computer. The port may support wireless communication. In another embodiment, the processor 104 is separate from the electronic paper 102. In one embodiment, the processor 104 communicates with the electronic paper 102 through wiring. In another embodiment the processor 104 is separate from the electronic paper 102 and communicates with the electronic paper 102 via wireless communication.

The electronic paper 102 includes a memory 106 in communication with the processor 104. The memory 106 includes an application 110 and the processor 104 executes the application 110. The application 110 may be controlled in some aspect via user input.

The memory 106 may be located within the electronic paper 102 or may be separate from the electronic paper 102. The system 100 may include a processor 104 and a memory 106 with the electronic paper 102 and another processor 104 and memory 106 separate from the electronic paper 102, perhaps in a computer, and in communication with the electronic paper 102 via a wired or wireless connection. One of skill in the art will recognize other combinations of processors 104 and memory 106 capable of controlling an application interface on electronic paper 102.

The electronic paper 102 also includes a detector 108 in communication with the processor 104 and in contact with the electronic paper 102. The detector 108 in contact with the electronic paper 102 may be embedded in, attached to, connected to, or fastened to the electronic paper 102 so that the detector 108 detects movement of the electronic paper 102. The detector 108 is configured to detect intentional bending of the electronic paper 102. Bending may include physical movement to alter the shape of the electronic paper 102 of any type, including but not limited to folding, creasing, indenting, deflecting, moving, or other intentional movement of a magnitude sufficient to be sensed by a detector 108.

The detector 108 may include one detector or a plurality of detectors. In a preferred embodiment, the detector 108 is a fiber optic cable capable of providing dynamic shape and position information. Such a fiber optic cable may be used to provide real-time feedback to the processor 104 regarding the cable's three-dimensional position. One example of this type of fiber optic cable is available from Luna Innovations®. Using a fiber optic cable capable of providing dynamic shape and position information is beneficial because the cable does not require any complex sensors or wiring and can be embedded in the electronic paper 102 or attached to the back of the electronic paper 102. The fiber optic cable is very thin and light-weight. The cable may be nearly transparent. The fiber optic cable provides a convenient solution to sensing bending of the electronic paper 102.

In one embodiment, fiber optic cable may form a grid pattern. In another embodiment, the fiber optic cable forms a plurality of rows on the electronic paper 102. In another embodiment, the fiber optic cable forms a spiral pattern on the electronic paper 102. In another embodiment, the fiber optic cable may be placed around the perimeter of the electronic paper 102. In yet another embodiment, the fiber optic cable is placed in strategic regions of the electronic paper 102 to correspond to intended bending locations. One of skill in the art will recognize other fiber optic patterns capable of detecting intentional bending of the electronic paper 102.

The detector 108 may also comprise one or more position sensors, pressure sensors, or other sensors capable of providing feedback to the processor 104 regarding intentional bending of the electronic paper 102. In one embodiment, the detector 108 is embedded in the electronic paper 102. In another embodiment, the detector 108 is attached to the electronic paper 102. In yet another embodiment, the detector 108 is partially embedded in the electronic paper 102. One of skill in the art will recognize other types of sensors and methods of attaching or embedding the detector 108 capable of providing information regarding intentional bending of the electronic paper 102.

The memory 106 includes a detection module 112 configured to detect intentional bending of the electronic paper 102 at a particular location. The detection module 112 detects changes in the shape of the electronic paper 102 and determines that the changes are intentional bending of the electronic paper 102. The detection module 112 may determine spatial resolution of a fiber-optic cable detector 108 in, or on, the electronic paper 102. Spatial resolution includes determining the shape of the electronic paper 102. Spatial resolution may include determining the position of the electronic paper 102 in three dimensions. The detection module 112 may determine an initial electronic paper 102 shape and a shape of the electronic paper 102 at a later time after bending of the electronic paper 102 by a user. The detection module 112 may then compare the initial position and later position of the electronic paper 102 to determine that the electronic paper 102 is bent. The detection module 112 may also detect bending from another type of sensor functioning as a detector 108 and determines if the electronic paper 102 has been bent.

The detection module 112 is configured to detect bending of the electronic paper 102 at a particular location. The detection module 112 may use an initial electronic paper 102 position, possibly when the electronic paper 102 is essentially flat, as a first position. The detection module 112 may be initialized and may correlate the detector 108 position with the initial electronic paper 102 position. The detection module 112 may detect a change in position of the detector 108 by detecting a position of the detector 108 at any particular time "t1" and then at any subsequent time "t2." The detection module 112 may then detect when the electronic paper 102 is bent by sensing a change in the position of the detector 108 from time t1 to t2 and the location of the bend.

The memory 106 includes a correlation module 114 configured to correlate the particular location where the electronic paper 102 is bent with a user interface command in an application 110. The correlation module 114 may correlate user interface commands in the application 110 with specific zones or regions of the electronic paper 102. The correlation module 114 then determines if the location of the bend detected by the detection module 112 is within an assigned zone or region of the electronic paper 102. If the bend occurs within an assigned zone or region, the correlation module 114 correlates the bend within the assigned zone or region to the corresponding user interface command of the application 110.

In one embodiment, the correlation module 114 and application 110 may change the use interface command assigned to a zone or region based on a user interface context. A user interface context is the current context in which the application 110 is being used. For example, the same specific region may serve as an acknowledgement button in one application context and a save button in another context of the application 110.

In one embodiment, the user interface command is a command for an operating system of the processor 104. In another embodiment, the user interface command is a command for a bios of the processor 104. In another embodiment, the user interface command is a command for an application 110 running on the operating system. One of skill in the art will recognize other user interface commands capable of receiving input from intentional bending of electronic paper 102.

The memory 106 includes an execution module 116 configured to execute the user interface command. When the correlation module 114 correlates a bend of the electronic paper 102 with a user interface command, the execution module 116 executes the user interface command. In one embodiment, the user interface command of the application 110 is a command to scroll a display on the electronic paper 102. In another embodiment, the user interface command brings up a menu. The user interface command may be a function selection, a return, a cursor movement, a page up or page down, a command to launch a function or program, or the like. One of skill in the art will recognize other user interface commands for an application 110 that may be controlled by intentional bending of the electronic paper 102.

In one embodiment, the memory 106 includes a display module 118 configured to update display information on the electronic paper 102 in response to execution of the user interface command. For example, if a menu command is executed by the execution module 116, the display module 118 displays a menu. If a page down command is executed by the execution module 116, the display module 118 displays the next page of data available from the application 110. One of skill in the art will recognize other ways to update a display on the electronic paper 102 in response to execution of a user interface command.

In another embodiment, the electronic paper 102 includes a power supply 120 configured to provide power to the processor 104, memory 106, display, and any other component on, or in, the electronic paper 102. The power supply 120 may be battery powered, solar powered, powered from an external source, or any other appropriate means to supply the energy required to permit the electronic paper 102 to function properly.

In a further embodiment, the electronic paper 102 includes an environmental sensor 122 configured to sense an environmental condition such as movement, temperature, pressure, air movement, or the like. The environmental sensor 122 is discussed further below.

Beneficially, the system 100 provides a convenient way to control an application 110 of electronic paper 102 without the use of traditional, bulky user input tools such as a keyboard or a mouse. The system 100 may allow a user to take electronic paper 102 anywhere and may be much more convenient than taking a book, a stack of papers, a brief case, a laptop, or other traditional information display. The system 100 also provides a way to control an application 110 running on electronic paper 102 that is rugged enough to adapt to numerous environments and conditions.

Figure 2:
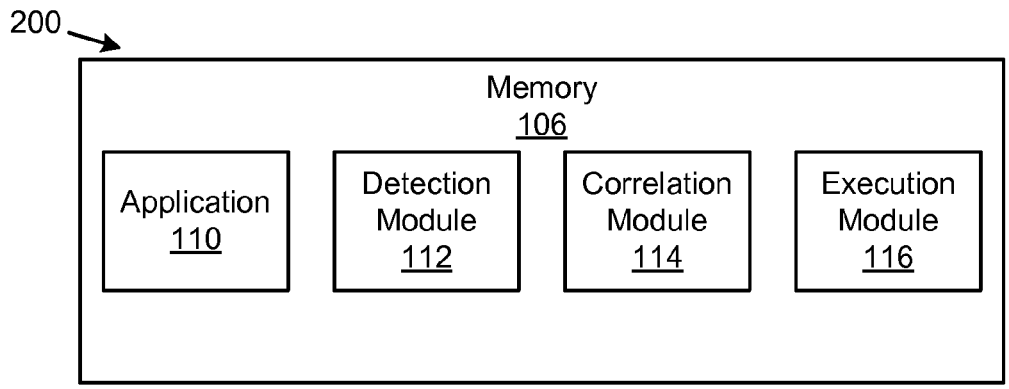
FIG. 2 is a schematic block diagram illustrating one embodiment of an apparatus to control an application interface displayed on electronic paper in accordance with the present invention.

FIG. 2 is a schematic block diagram illustrating one embodiment of an apparatus 200 to control an application interface displayed on electronic paper 102 in accordance with the present invention. The apparatus 200 includes a memory 106 with an application 110, a detection module 112, a correlation module 114, and an execution module 116, which are substantially similar to the memory 106 and modules described in relation to FIG. 1. The apparatus 200 may be included in the electronic paper 102 or may be separate from the electronic paper 102 and may communicate with a processor 104 that is in communication with the electronic paper 102. The apparatus 200 may be divided so some parts of the apparatus 200 are included with the electronic paper 102 while other parts of the apparatus 200 are separated from the electronic paper 102.

Figure 3:
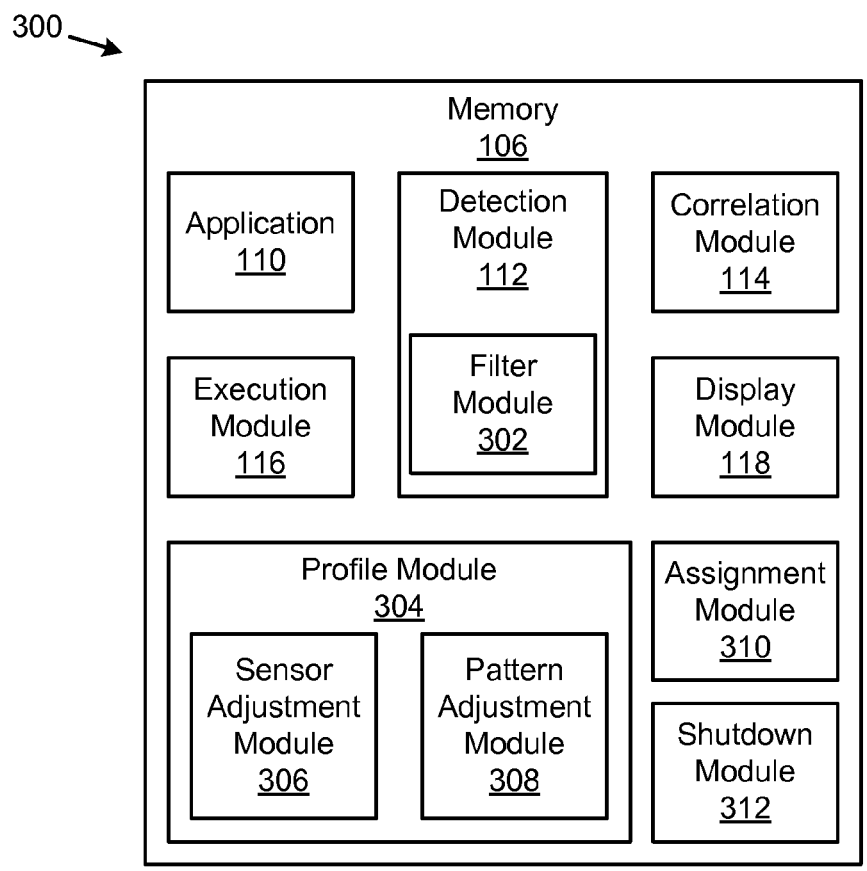
FIG. 3 is a schematic block diagram illustrating another embodiment of an apparatus to control an application interface displayed on electronic paper in accordance with the present invention.

FIG. 3 is a schematic block diagram illustrating another embodiment of an apparatus 300 to control an application interface displayed on electronic paper 102 in accordance with the present invention. The apparatus 300 includes a memory 106 with an application 110, a detection module 112, a correlation module 114, an execution module 116, and a display module 118 which are substantially similar to the memory 106 and modules described in relation to FIG. 1.

In one embodiment, the detection module 112 includes a filter module 302 configured to distinguish between unintentional movement of the electronic paper 102 and intentional bending of the electronic paper 102 at a particular location. The filter module 302 may receive input from a detector 108. The filter module 302 may include threshold information set to distinguish between unintentional movement of the electronic paper 102 that may cause slight bending or deflection while being carried, moved about, blown by the wind, etc. and intentional bending at a particular location signifying that the user wishes to execute a user interface command. The filter module 302 may also use information from an environmental sensor 122 to determine if movement or bending of the electronic paper 102 is intentional or unintentional. The filter module 302 may also include zone settings that define boundaries on the electronic paper 102; each zone may correspond to a user interface command of the application 110. For example, a zone at the top of the electronic paper 102 may correspond to a scroll up command while a zone at the bottom of the electronic paper 102 may correspond to a scroll down command. A zone in the corner of the electronic paper 102 may correspond to a menu command and when a user bends the corner of the electronic paper, the detection module 112 detects bending of the paper and the filter module 302 determines that the bending is in the corner bending zone. One of skill in the art will recognize other ways for the filter module 302 to filter out unintentional movement or bending in a location not part of a zone and to determine when the electronic paper 102 is intentionally bent in a particular location.

In another embodiment, the memory 106 includes a profile module 304 configured to store a profile referenced by the detection module 112, where the profile comprises sensitivity parameters associated with an environmental condition. In one embodiment the profile is a set of sensitivity parameters associated with a particular application 110. In another embodiment, the profile includes different sensitivity parameters for different environmental conditions. For example, one profile may correspond to windy conditions and may decrease bending sensitivity to prevent false recognition of bending of the electronic paper 102. Another profile may correspond to movement of the electronic paper 102 such as when a user is holding the electronic paper 102 on a train, a bus, or in a car and may adjust the sensitivity parameters to accommodate for the situation to avoid registering a bend for unintentional bending of the electronic paper 102. Another profile may correspond to quiet reading of electronic paper 102 at a desk. In this situation, the sensitivity parameters may be relatively sensitive to bending of the electronic paper 102. In one embodiment, a user may select a profile based on anticipated environmental conditions. One of skill in the art will recognize other profiles appropriate to prevent false registering of unintentional bending of electronic paper 102.

In one embodiment, the profile module 304 includes a sensor adjustment module 306 configured to adjust sensitivity parameters based on input from an environmental sensor 122. For example, if the environmental sensor 122 detects certain movement, such as a rhythmic-type movement associated with riding on a train, the sensor adjustment module 306 may select a train ride profile. If the environmental sensor 122 detects a windy condition, the sensor adjustment module 306 may select a wind profile. The sensor adjustment module 306, in one embodiment, may use input from a detector 108 and an environmental sensor 122 to select a profile, or alternatively may use input solely from a detector 108 to select a profile. The sensor adjustment module 306 may automatically select a profile or may provide information to a user or to an application 110 to allow the user or application 110 to select an appropriate profile. One of skill in the art will recognize other ways that the sensor adjustment module 306 may select sensitivity parameters based on input from an environmental sensor 122, detector 108, or other sensor.

In another embodiment, the profile module 304 includes a pattern adjustment module 308 configured to adjust sensitivity parameters based on a pattern of use. Sensitivity parameters may relate to the amount of bending, the size of a bending zone on the electronic paper 102, the location of a bending zone, or other relevant parameter used to distinguish between unintentional and intentional bending.

For example, the pattern adjustment module 308 may detect a pattern of bending close to or crossing a zone boundary on the electronic paper 102 and may adjust the location or size of the zone to conform to the pattern of bending. In another example, the pattern adjustment module 308 may detect intentional bending over a wide range and may adjust a zone sensitivity to conform to the wide range of bending. In yet another example, the pattern adjustment module 308 may detect bending in a very narrow region of a zone and may adjust the zone to be narrower. One of skill in the art will recognize other patterns of use that may be used by the pattern adjustment module 308 to adjust sensitivity or other parameters.

The memory 106, in one embodiment, includes an assignment module 310 configured to assign a region of the electronic paper 102 to at least one corresponding user interface command. For example, the assignment module 310 may assign a region of the electronic paper 102 to a user interface command based on user interface configuration information. In another example, the assignment module 310 may assign various regions of the electronic paper 102 to corresponding user interface commands based on requirements or programming of an application 110. In another example, the assignment module 310 may assign regions based on both requirements of an application 110 and user input. One of skill in the art will recognize other ways to assign regions of the electronic paper 102 to user interface commands.

The memory 106 may also include, in another embodiment, a shutdown module 312 configured to stop detecting intentional bending of at least a portion of the electronic paper 102 based on factors such as non-use, user input, and an application interface configuration. The shutdown module 312 may shut down the detection module 112. In one example, the shutdown module 312 shuts down detecting of intentional bending for a part of the electronic paper 102 due to no bending regions having been assigned to user interface commands in that region. In another example, the shutdown module 312 shuts down all or a part of the detecting of intentional bending in response to user input.

In yet another example, the shutdown module 312 shuts down detecting of intentional bending of a portion or all of the electronic paper 102 due to non-use. Non-use may be determined by detecting no bending or minimal bending of the electronic paper 102 for a period of time. Non-use may also be determined through no selection of user interface commands for a period of time or by detecting no movement by way of an environmental sensor 122. One of skill in the art will recognize other criteria to determine non-use.

In one embodiment, shutting down detecting comprises reducing the frequency of detecting to a level that will save power while maintaining enough detecting so that intentional bending or other input "wakes up" the detecting to restore the detecting frequency or to increase the detecting rate. In another embodiment, shutting down detecting comprises completely shutting down detecting of intentional bending of at least a portion of the electronic paper 102. Detecting may be shut down for most of the electronic paper 102 and the detecting may continue for a portion of the electronic paper 102, possibly in a corner of the electronic paper 102. The portion of the electronic paper 102 with active detection may detect bending at a fully functional level or at a reduced frequency.

Beneficially, shutting down all or part of the detecting of intentional bending of the electronic paper 102 may allow operation of the electronic paper 102 at a reduced power level. The reduced power level may conserve energy in a battery or other stored energy source. In addition, shutting down all or part of the detecting of intentional bending may allow a user to place the electronic paper 102 in condition for transporting or other use where the user wishes to disable execution of user interface commands. One of skill in the art will recognize other ways to shut down at least a portion of the detecting of intentional bending of electronic paper 102 based on non-use, user input, an application interface configuration, or the like to take advantage of power reduction, reduced sensitivity, or other beneficial use of shutting down detecting.

Figure 4:
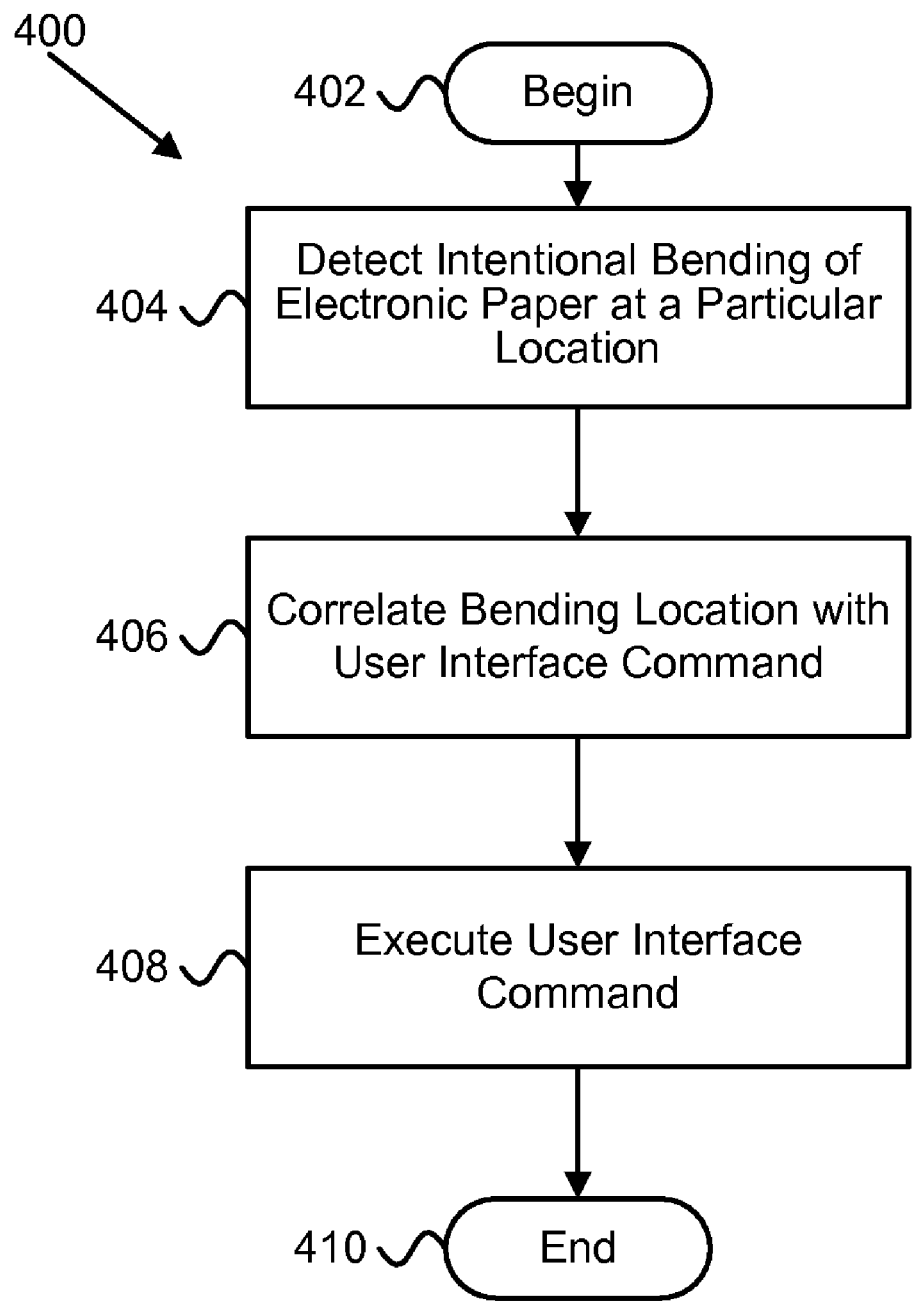
FIG. 4 is a schematic flow chart diagram illustrating one embodiment of a method to control an application interface displayed on electronic paper in accordance with the present invention.

FIG. 4 is a schematic flow chart diagram illustrating one embodiment of a method 400 to control an application interface displayed on electronic paper 102 in accordance with the present invention. The method 400 begins 402 and the detection module 112 detects 404 intentional bending of the electronic paper 102 at a particular location. The detection module 112 receives input from the detector 108, but may also receive input from an environmental sensor 122. The correlation module 114 correlates 406 the particular bending location with a user interface command of the application 110. If the correlation module finds no correlation, the bend is ignored. If a correlating user interface command is found, the execution module 116 executes 408 the user interface command and the method 400 ends 410.

Figure 5:
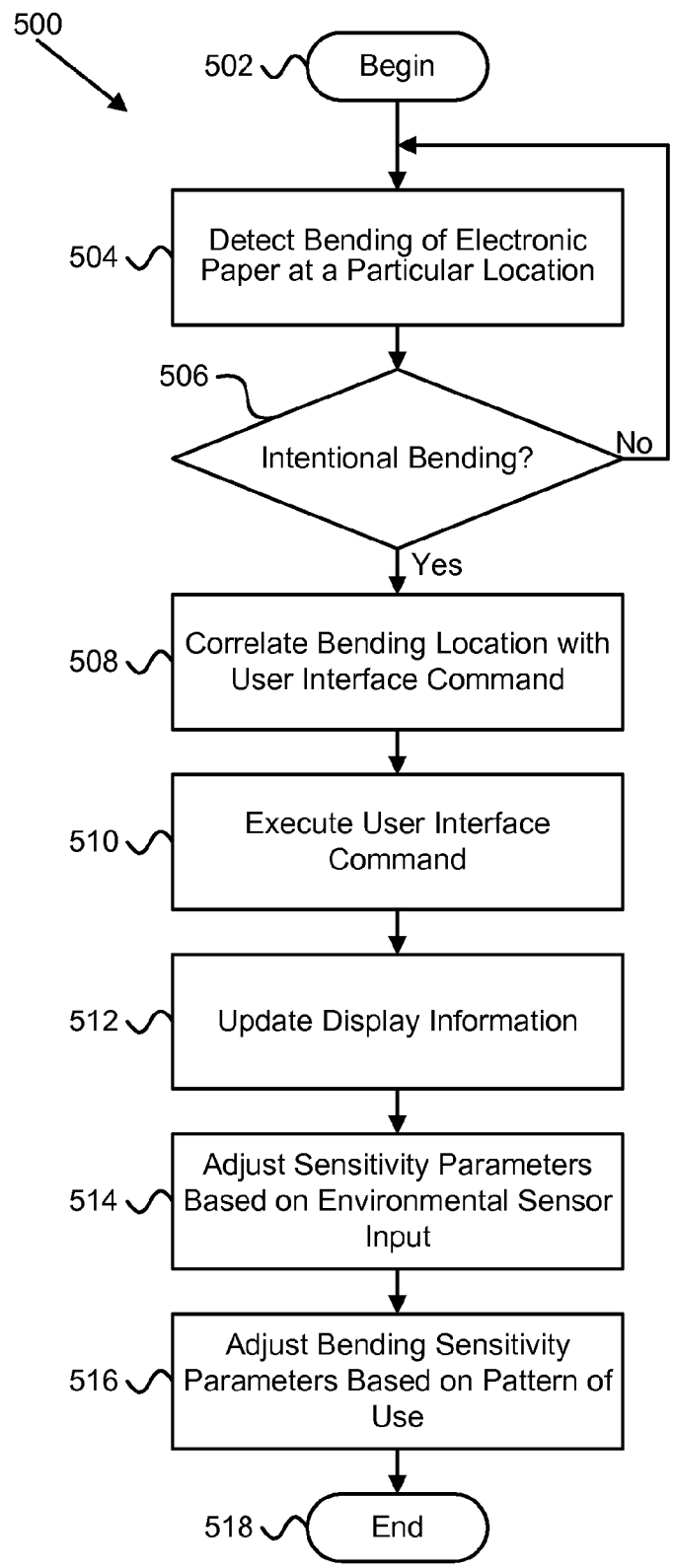
FIG. 5 is a schematic flow chart diagram illustrating another embodiment of a method to control an application interface displayed on electronic paper in accordance with the present invention.

FIG. 5 is a schematic flow chart diagram illustrating another embodiment of a method 500 to control an application interface displayed on electronic paper 102 in accordance with the present invention. The method 500 begins 502 and the detection module 112 detects 504 bending of the electronic paper 102 at a particular location. The filter module 302 determines 506 if the bending is intentional. The filter module 302 may use input from the detector 108 or from one or more detectors 108 and environmental sensors 122. The filter module 302 may also determine if the bending is within a particular zone or region. If the filter module 302 determines 506 the bending or movement is unintentional, the method 500 returns and the detection module 112 detects 504 if there is further bending of the electronic paper 102 at a particular location.

If the filter module 302 determines 506 that the bending is intentional, the correlation module 114 correlates 508 the bending location on the electronic paper 102 with a user interface command. Intentional bending may be bending within a particular zone or region and may also be defined as bending beyond a particular limit. For example, a bending limit may be set at 30 degrees so that if the electronic paper 102 is bent a particular location beyond a 30 degree angle, then the bending qualifies as intentional.

If a correlating user command is found, the execution module 116 executes 510 the user interface command and the display module 118 updates 512 the display information on the electronic paper 102. In one embodiment, the sensor adjustment module 306 adjusts 514 sensitivity parameters based on input from one or more environmental sensors 122. In another embodiment, the pattern adjustment module 308 adjusts 516 bending sensitivity parameters based on a pattern of use and the method 500 ends 518.

Figure 6:
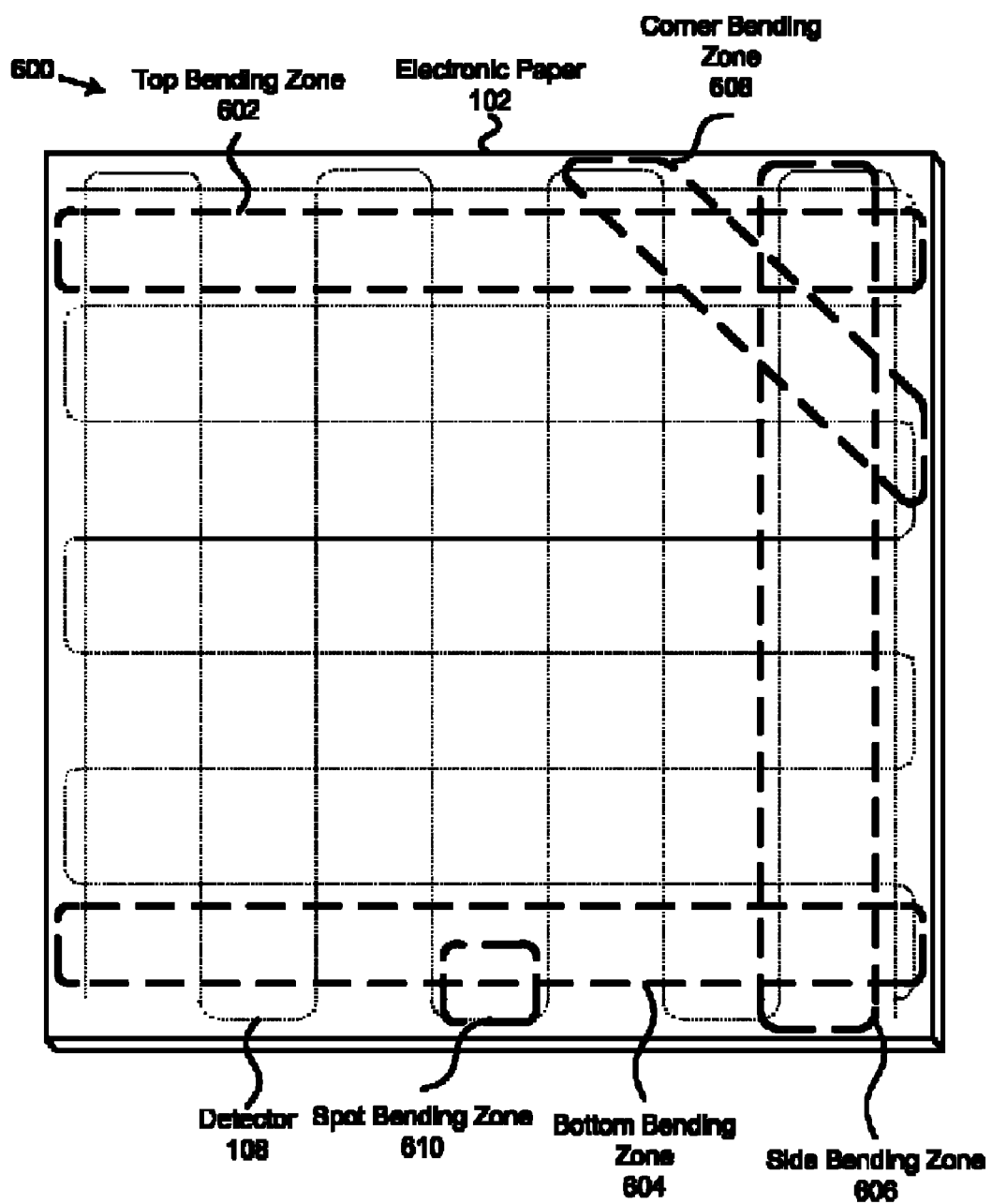
FIG. 6 a schematic block diagram illustrating bending zones to control an application interface displayed on electronic paper in accordance with the present invention.

FIG. 6 depicts a schematic block diagram 600 illustrating bending zones to control an application interface displayed on electronic paper 102 in accordance with the present invention. The depicted electronic paper 102 includes a detector 108 in a grid pattern. The detector 108 typically is embedded in the electronic paper 102 or attached to the back side of the electronic paper 102. The detector 108 depicted here may be a fiber optic cable capable of providing position information to the detection module 112.

A top bending zone 602, a bottom bending zone 604, a side bending zone 606, a corner bending zone 608, and a spot bending zone 610 are depicted and represent possible zones or regions on the electronic paper 102 that may be assigned to user interface commands of an application 110. For example, the top and bottom bending zones 602, 604 may be assigned to a scroll up and a scroll down command or possibly a page up and a page down command. The same top and bottom bending zones 602, 604 may be assigned scroll and page up/down commands and the commands may be distinguished by the amount of bending. For example, a scroll command may correspond to a bending of 10 to 20 degrees while a page up/down command may correspond to a bending of greater than 30 degrees. The scroll command may include a time delay before response to verify that the bending is intended to be a scroll and is not a transient bending that may result in a page up/down command. In another embodiment, the top and bottom bending zones 602, 604 may correlate to scroll commands and the angle of bending of the electronic paper 102 may dictate the speed of scrolling.

A side bending zone 606 may be assigned to a sideways scroll command. A corner bending zone 608 may be assigned to bring up a menu or possibly to a selection command. One or more spot bending zones 610 may be assigned to cursor movement commands to allow a user to move a cursor in the display on the electronic paper 102. One of skill in the art will recognize that there are many possible commands and possible zone locations and types and that the zones, commands, and amount of bending may change from application 110 to application 110.

In one embodiment, a user may bend an electronic paper 102 along a side, but the bending may be close to the edge of a side bending zone 606. In another embodiment, the bending may be angled and may partially cross a side bending zone 606. The pattern adjustment module 308 may detect a discernable pattern in the bending and may dynamically adjust the sensitivity or location of a zone to accommodate repeated, intentional bending.

Detecting intentional bending of electronic paper 102 to execute a user interface command is beneficial because it provides a convenient way to control an application 110, operating system, bios, or other program associated with the electronic paper 102. The apparatuses, systems, and methods for flex input to electronic paper 102 allow a user to control an application 110 without using traditional input devices such as a keyboard or mouse. Detecting environmental conditions is advantageous to allow sensitivity parameter adjustment based on the user's environment. Modification of sensitivity parameters based on patterns of use is advantageous to avoid user frustration and to more accurately discern intended bending of the electronic paper 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes within the range of equivalency of the claims are to be embraced within their scope.

What is claimed is:

1. An apparatus to control an application interface display on electronic paper, the apparatus comprising:
   a detection module configured to detect intentional bending of an electronic paper at a particular location;
   a correlation module configured to correlate the particular location where the electronic paper is bent with a user interface command in an application;
   a profile module that stores two or more profiles, each profile comprising a set of predefined sensitivity parameters, the set of predefined sensitivity parameters comprising an intentional bend threshold that defines an amount of bend required for the detection module to detect an intentional bend and a bending zone size that defines a size of the particular location of the electronic paper at which an intentional bend is detected;
   a pattern adjustment module that detects a pattern of intentional bends close to a bend zone boundary, the adjustment pattern module automatically adjusting the bend zone size of the bend zone associated with the bend zone boundary based on the pattern of intentional bends; and
   an execution module configured to execute the user interface command.

2. The apparatus of claim 1, further comprising a display module configured to update display information on the electronic paper in response to execution of the user interface command.

3. The apparatus of claim 2, wherein the electronic paper further comprises a detector in contact with the electronic paper and configured to provide electronic paper bend position information to the detection module.

4. The apparatus of claim 3, wherein the detector comprises fiber-optic cable configured to provide the fiber-optic cable's spatial resolution.

5. The apparatus of claim 4, wherein the fiber-optic cable is configured in a grid pattern in contact with the electronic paper.

6. The apparatus of claim 5, wherein the detection module further comprises a filter module configured to distinguish between unintentional movement of the electronic paper and intentional bending of the electronic paper at a particular location.

7. The apparatus of claim 6, further comprising an assignment module configured to assign a region of the electronic paper to at least one corresponding user interface command.

8. The apparatus of claim 7, wherein at least one of the two or more profiles comprises one or more sensitivity parameters associated with an environmental condition.

9. The apparatus of claim 8, wherein the profile module further comprises a sensor adjustment module configured to adjust the one or more sensitivity parameters associated with the environmental conditions based on input from an environmental sensor.

10. The apparatus of claim 9, wherein the pattern adjustment module adjusts the intentional bend threshold of at least one profile based on a pattern of use.

11. The apparatus of claim 10, further comprising a shutdown module configured to stop detecting intentional bending of at least a portion of the electronic paper based on a group of factors consisting of non-use, user input, and an application interface configuration.

12. A system to control an application interface display on electronic paper, the apparatus comprising:
    an electronic paper;
    a processor in communication with the electronic paper and configured to execute an application; and
    a memory in communication with the processor comprising
       a detection module configured to detect intentional bending of an electronic paper at a particular location;
       a correlation module configured to correlate the particular location where the electronic paper is bent with a user interface command in an application;
       a profile module that stores two or more profiles, each profile comprising a set of predefined sensitivity parameters, the set of predefined sensitivity parameters comprising an intentional bend threshold that defines an amount of bend required for the detection module to detect an intentional bend and a bending zone size that defines a size of the particular location of the electronic paper at which an intentional bend is detected;
    a pattern adjustment module that detects a pattern of intentional bends close to a bend zone boundary, the adjustment pattern module automatically adjusting the bend zone size of the bend zone associated with the bend zone boundary based on the pattern of intentional bends;
    an execution module configured to execute the user interface command; and
    a display module configured to update display information on the electronic paper in response to the user interface command.

13. The system of claim 12, wherein the processor and memory are onboard the electronic paper and the system further comprises a port connected to the processor configured to exchange data between the processor and a computer, wherein the port supports a wireless communication.

14. The system of claim 12, wherein the electronic paper further comprises fiber-optic cable in contact with the electronic paper to provide electronic paper bend position information to the detection module, wherein the fiber-optic cable is configured to provide the fiber-optic cable's spatial resolution.

15. The system of claim 12, further comprising a power supply onboard the electronic paper and configured to provide power to the electronic paper, processor and memory.

16. A computer program product comprising a non-transitory computer readable medium having computer usable program code programmed to control an application interface displayed on electronic paper, the operations of the computer program product comprising:
    detecting intentional bending of an electronic paper at a particular location;
    correlating the particular location where the electronic paper is bent with a user interface command in an application;

detecting an environmental condition associated with the electronic paper;

automatically selecting one of two or more stored profiles in response to an input signal from the environmental sensor, each profile comprising a set of predefined sensitivity parameters, the set of predefined sensitivity parameters comprising an intentional bend threshold that defines an amount of bend required to register as an intentional bend and a bending zone size that defines a size of the particular location of the electronic paper at which an intentional bend is detected, the selected profile configured to improve operation of the electronic paper in accordance with the detected environmental condition;

determining a level of sensitivity associated with an intentional bending of the electronic paper based on the sensitivity parameters defined by the selected profile;

adjusting the sensitivity parameters of the selected profile in response to input from the environmental sensor;

detecting a pattern of intentional bends close to a bend zone boundary, and automatically adjusting the bend zone size of the bend zone associated with the bend zone boundary based on the pattern of intentional bends;

filtering unintentional bends of the electronic paper based on the sensitivity parameters, the sensitivity parameters defining a threshold at which a bend corresponds to an intentional bend of the electronic paper wherein the intentional bend corresponds to a user interface command;

executing the user interface command; and updating information on the electronic paper in response to execution of the user interface command.

17. The computer program product of claim 16, further comprising defining two or more user interface contexts, each user interface context defining a set of user interface commands, each set of user interface commands corresponding to a set of predefined locations of the electronic paper such that each distinct user interface command corresponds to a predefined location of the electronic paper.

18. The computer program product of claim 17, further comprising switching from a first user interface context to a second user interface context in response to an input signal such that a predefined location of the electronic paper is reconfigured to correspond to a user interface command associated with the second user interface context instead of the first user interface context.

19. The computer program product of claim 16, wherein the environmental sensor is configured to detect one of spatial movement and wind speed.

20. The computer program product of claim 16, further comprising switching from a first selected profile to a second selected profile in response to an input signal.

* * * * *